US012172168B2

(12) United States Patent
Antoine et al.

(10) Patent No.: US 12,172,168 B2
(45) Date of Patent: Dec. 24, 2024

(54) THERMAL PLATFORM AND A METHOD OF FABRICATING A THERMAL PLATFORM

(71) Applicant: Analog Devices International Unlimited Company, Limerick (IE)

(72) Inventors: Christophe Antoine, London (GB); Helen Berney, Limerick (IE); Bernard Stenson, Upper Manister (IE); Ramji Sitaraman Lakshmanan, Limerick (IE); William Allan Lane, Waterfall (IE); Himanshu Jain, Limerick (IE); Christina B. McLoughlin, Crecora (IE); Shane Geary, Sixmilebridge (IE); Michael C. W. Coln, Lexington, MA (US); Donal McAuliffe, Raheen (IE); Roman Trogan, Needham, MA (US)

(73) Assignee: Analog Devices International Unlimited Company, Limerick (IE)

( * ) Notice: Subject to any disclaimer, the term of this patent is extended or adjusted under 35 U.S.C. 154(b) by 209 days.

(21) Appl. No.: 17/621,184

(22) PCT Filed: Jun. 22, 2020

(86) PCT No.: PCT/EP2020/067365
§ 371 (c)(1),
(2) Date: Dec. 20, 2021

(87) PCT Pub. No.: WO2020/254691
PCT Pub. Date: Dec. 24, 2020

(65) Prior Publication Data

US 2022/0126300 A1 Apr. 28, 2022

Related U.S. Application Data

(60) Provisional application No. 62/864,668, filed on Jun. 21, 2019.

(51) Int. Cl.
*B01L 7/00* (2006.01)

(52) U.S. Cl.
CPC ............ *B01L 7/52* (2013.01); *B01L 2200/12* (2013.01); *B01L 2200/147* (2013.01);
(Continued)

(58) Field of Classification Search
CPC ................ B01L 2300/0887; B01L 2300/1883
See application file for complete search history.

(56) References Cited

U.S. PATENT DOCUMENTS 8,378,206 B2 2/2013 Schuette et al.
8,470,153 B2 6/2013 Feiglin et al.
(Continued)

FOREIGN PATENT DOCUMENTS

CN 1463038 12/2003
CN 101247715 8/2008
(Continued)

OTHER PUBLICATIONS

"Chinese Application Serial No. 202080045341.4, Response filed Dec. 29, 2022 to Office Action mailed Aug. 18, 2022", 5 pgs.
(Continued)

*Primary Examiner* — Ana M Vazquez
(74) *Attorney, Agent, or Firm* — Schwegman Lundberg & Woessner, P.A.

(57) ABSTRACT

A microfabricated thermal platform can be formed over a substrate, such as a silicon wafer, that may form part of the platform. The substrate is coated in a thermally-insulating material, which may be an organic polymer such, as polyimide or SUS. The surface of the thermally-insulating material may include an arrangement of one or more thermal sites, with each site having a reaction plate (or thermal plate) over which chemical reactions may occur. A heating element may be positioned beneath each reaction plate. A fluidic
(Continued)

medium, such as a liquid or a gas, may be disposed over the thermal sites. One application is in chemical and biological reactions. In such reactions, the fluidic medium may be an aqueous solution which comprises reagents for those reactions. The fluidic medium may be an ionically conducting fluid, organic solution or a gas. Precise temperature control enables the correct reactions.

30 Claims, 11 Drawing Sheets

(52) U.S. Cl.
CPC . *B01L 2300/0887* (2013.01); *B01L 2300/123* (2013.01); *B01L 2300/1827* (2013.01); *B01L 2300/1883* (2013.01)

(56) References Cited

U.S. PATENT DOCUMENTS

| | | | |
|---|---|---|---|
| 10,067,122 B2 | 9/2018 | Yu et al. | |
| 11,577,251 B2 * | 2/2023 | Hayes | H01L 23/38 |
| 2002/0150683 A1 | 10/2002 | Troian et al. | |
| 2004/0065655 A1 | 4/2004 | Brown et al. | |
| 2005/0139993 A1 | 6/2005 | Lee et al. | |
| 2005/0254552 A1 | 11/2005 | Bruce et al. | |
| 2006/0081558 A1 | 4/2006 | Collins et al. | |
| 2008/0199688 A1 | 8/2008 | Ozawa | |
| 2009/0155959 A1 | 6/2009 | Lin et al. | |
| 2011/0000426 A1 | 1/2011 | Herchen | |
| 2012/0074131 A1 | 3/2012 | Olson | |
| 2013/0157271 A1 | 6/2013 | Coursey et al. | |
| 2013/0187269 A1 | 7/2013 | Lin et al. | |
| 2013/0333762 A1 | 12/2013 | Winger | |
| 2015/0079667 A1 | 3/2015 | Brahmasandra et al. | |

FOREIGN PATENT DOCUMENTS

| | | |
|---|---|---|
| CN | 101542763 | 9/2009 |
| CN | 102668058 | 9/2012 |
| CN | 102928610 | 2/2013 |
| CN | 104303056 | 1/2015 |
| CN | 113993624 | 1/2022 |
| WO | WO-2007034240 A2 | 3/2007 |
| WO | WO-2018104698 A1 | 6/2018 |

OTHER PUBLICATIONS

"Chinese Application Serial No. 202080045341.4, Office Action mailed Mar. 8, 2023", w/ English Machine Translation, 28 pgs.

"Chinese Application Serial No. 202080045341.4, Office Action mailed Aug. 18, 2022", w/ English Translation, 20 pgs.

"Chinese Application Serial No. 202080045341.4, Response filed May 22, 2023 to Office Action mailed Mar. 8, 2023", w/ English Claims, 16 pgs.

"Chinese Application Serial No. 202080045341.4, Office Action mailed Jul. 19, 2023", 10 pgs.

* cited by examiner

THERMAL PLATFORM AND A METHOD OF FABRICATING A THERMAL PLATFORM

CLAIM OF PRIORITY

This patent application is a National Stage of PCT Application Serial No. PCT/EP2020/067365 filed Jun. 22, 2020, and published as WO 2020/254691 A1, on Dec. 24, 2020, which claims the benefit of priority to U.S. Provisional Application Ser. No. 62/864,668, filed Jun. 21, 2019, which are hereby incorporated by reference herein in their entirety, and the benefit of priority of each of which is hereby claimed.

FIELD OF THE DISCLOSURE

The present disclosure relates to a thermal platform and a method of fabrication of a thermal platform. In particular, the present disclosure relates to a microfabricated thermal platform, which uses heating elements to maintain a desired temperature.

BACKGROUND

Certain chemical and biological reactions require accurate temperature control. Examples include Polymerase Chain Reactions (PCRs), thermally-assisted hydrolysis and methylation, and other thermally-enabled reactions. It is known to provide thermal platforms to control such reactions. A thermal platform typically includes a thermal plate (sometimes referred to as a reaction plate), which may be coated in a catalyst, which is heated to the desired temperature using a heater arrangement. A flow-channel is typically provided above the reaction plate, in order to introduce the necessary chemicals to the reaction site. Such thermal platforms may be manufactured using semiconductor-based microfabrication techniques. Semiconductor processes and materials enable thermal platforms to be produced which are small in size, provide a large number of sites per platform, and are well suited in terms of their material properties.

Known techniques require improved thermal accuracy and are inefficient from a power consumption perspective.

SUMMARY OF THE DISCLOSURE

The present disclosure relates to a microfabricated thermal platform. The platform is formed over a substrate, which may for example be a silicon wafer, and which may form part of the platform. The substrate is coated in a thermally-insulating material, which may be an organic polymer such, as polyimide or SU8. The thermally-insulating material may have a predetermined thermal conductivity, which is dependent on thickness, geometry and processing. The surface of the thermally-insulating material may include an arrangement of thermal sites, with each site having a reaction plate (or thermal plate) over which chemical reactions may occur. A heating element may be positioned beneath each reaction plate. The thermal platform may have a plurality of such thermal sites arranged over the upper surface of the thermally-insulating material. However, it will be appreciated that in practice, there could be a single thermal site. In use, the thermal platform may have a fluidic medium, such as a liquid or a gas, disposed over the thermal sites. One application for the thermal platform is in chemical and biological reactions. In such reactions, the fluidic medium may be an aqueous solution which comprises reagents for those reactions. The fluidic medium may be an ionically conducting fluid, organic solution or a gas. Precise temperature control enables the correct reactions to occur.

The reaction plates may be metallic plates formed over, or embedded in the surface of the thermally-insulating material. The reaction plates may be heated using the heating elements, which may be resistors. The resistors may be formed within the microfabricated structure, in close proximity, but separated from the reaction plates. Alternatively, the reaction plates may themselves be resistors.

The thermal platform may also include a thermometer or temperature sensor which monitors the temperature of the fluidic medium directly, or by proxy, and which provides an output signal to a control mechanism. For example, the temperature sensor may measure the temperature of the reaction plate, the area above or beside the reaction plate, or the fluidic medium above the thermal site. The control mechanism may be coupled to the heating element, thereby providing a closed control loop. In use, the control mechanism may be used to control the heater to maintain the thermal site at a particular temperature.

In a first aspect, the present disclosure provides a microfabricated thermal platform for controlling the temperature of a fluid or other material positioned over the thermal platform, the platform comprising a plurality of microfabricated layers, the platform comprising: a thermally-insulating layer, formed from an organic polymer, having a predefined thermal conductivity, the thermally-insulating layer configured to provide thermal insulation between the fluid or other material positioned over the thermal platform, and a substrate positioned beneath the thermal platform; an electrically-conductive layer, formed on or adjacent an upper surface of the thermally-insulative layer, the electrically-conductive layer patterned to define at least one heating element; one or more electrically conductive vias, formed in the thermally-insulating layer, the vias electrically coupled to the electrically-conductive layer; an electrically-insulative layer, formed over the electrically-conductive layer; and at least one thermal plate, formed over the electrically-insulative layer; wherein the at least one heating element and the at least one thermal plate define a thermal site in which the temperature of a fluid or other material positioned over the thermal platform may be controlled.

In a second aspect, the present disclosure provides a method of microfabricating a thermal platform, comprising: depositing an organic polymer to form a thermally-insulating layer having a predefined thermal conductivity; forming one or more electrically conductive vias in the thermally-insulating layer; depositing an electrically-conductive layer, on or adjacent an upper surface of the thermally-insulating layer, such that the electrically-conductive layer is electrically coupled to the one or more vias; patterning the electrically-conductive layer to define at least one heating element; forming an electrically-insulative layer over the electrically-conductive layer; and depositing at least one thermal plate over the electrically-insulative layer.

In a third aspect, the present disclosure provides a microfabricated thermal platform, comprising one or more thermal sites configured to control the temperature of a fluid or other material at the one or more thermal site, the thermal platform including a plurality of layers, formed using microfabrication techniques, and including a layer of organic polymer having a predetermined thermal conductivity, each of the one or more thermal sites including a heating element, to heat the fluid or other material, and a thermal plate.

Further feature of the disclosure are listed in the examples and claims found at the end of this specification.

BRIEF DESCRIPTION OF THE DRAWINGS

The present disclosure will now be described, by way of example only, and with reference to the accompanying drawings in which.

DETAILED DESCRIPTION OF THE DISCLOSURE

Certain chemical and biological reactions require accurate temperature control. Examples of liquid-phase chemical reactions include Polymerase Chain Reactions (PCRs), thermally-assisted hydrolysis and methylation, and other thermally-enabled reactions. Gas-phase chemical reactions may also require temperature control. It is known to provide thermal platforms to control such reactions. A thermal platform typically includes a reaction plate, which may be coated in a catalyst, which is heated to the desired temperature using a heater arrangement. A flow-channel is typically provided above the reaction plate, in order to introduce the necessary chemicals to the reaction site. Such thermal platforms may be manufactured using semiconductor-based microfabrication techniques. Semiconductor processes and materials enable thermal platforms to be produced which are small in size, provide a large number of sites per platform, and are well suited in terms of their material properties.

The present disclosure provides a thermal platform which may be manufactured using microfabrication techniques, and which uses a thermally-insulating layer of organic polymer, such as polyimide or SU8. Organic polymers have material properties which make them well suited for use in thermal platforms. For example, they provide adequate thermal stability and inertia to ensure the temperature of the thermal site can be maintained. Additionally, they provide adequate thermal insulation to protect any electronic components formed in an application specific integrated circuit (ASIC) positioned below, and integrated monolithically with the thermal platform. Their thermally insulative properties also mean that there is a reduced requirement to provide thermally conductive vias down to the substrate to facilitate cooling.

The thermal platform may also include a thermal plate, which may be used to perform chemical or biological reactions. A heater, in the form of a resistive element, may be positioned beneath, or in close proximity to the thermal plate. A thermometer, also in the form of a resistive element, may also positioned beneath or in close proximity to the thermal plate. As an alternative, the heater and thermometer may be formed from the same resistive element. In the latter case, switches and a time division multiplexing process may be used to divide the use of the resistive element between heating and temperature checks.

Figure 1A:
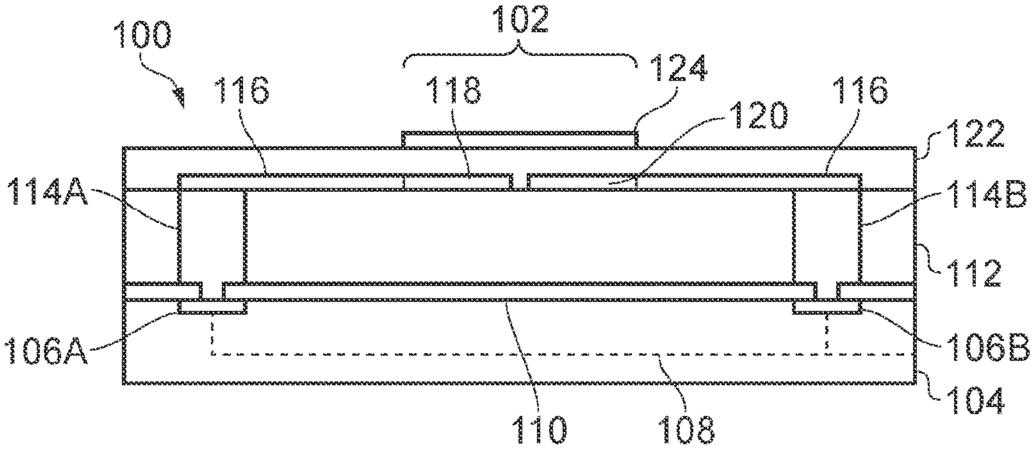
FIG. 1A is a cross-section of a thermal platform in accordance with the disclosure.

FIG. 1A shows a cross-section of a microfabricated thermal platform 100. In this example, the thermal platform 100 includes a single unit cell, or thermal site, as denoted generally by reference 102. The thermal platform includes a substrate 104, which may for example be a silicon wafer. The substrate 104 may form part of the thermal platform, in which case the thermal platform and substrate may be formed as an integrated monolithic structure. Alternatively, the substrate may be separate to the thermal platform, the thermal platform being formed on top of the substrate. In a further alternative, the thermal platform 100 may not include the substrate, and may instead be a standalone structure. The substrate 104 may be a silicon wafer which may be thinned to a minimum thickness while ensuring mechanical stability. For example, the silicon wafer may be in the order of 200 μm thick and have a thermal conductivity of around 150 W/mK. The degree of substrate thinning will depend on the required balance of mechanical stability and thermal conductivity. In one example, the wafer may be less than 300 μm thick. In another example, the wafer is between 150 μm and 250 μm thick. The thermal conductivity of the wafer may be between 100 and 200 W/mK. A heat sink may be provided below the substrate to enable heat from the thermal sites to pass through the substrate. Alternatively, an un-thinned wafer may be used. The thickness of such a wafer may be around 725 μm. As such, in one example the substrate may be between 650 μm and 750 μm.

The substrate 104 may include metallic contacts 106A, 106B, formed in the upper surface of the substrate. These contacts are for making electrical connections between the components of the thermal platform, and to any traces or circuitry in the substrate. In the example of FIG. 1, a trace 108 is shown. This is intended to be merely representative of traces or circuitry that may be formed in the substrate.

A layer of passivation 110 is formed over the substrate 104. The passivation layer 110 has openings aligned with the metallic contacts 106A, 106B. A layer of thermally-insulating material 112 which may be formed from an organic polymer such as polyimide or SU8, having a relatively low thermal conductivity, is formed on top of the passivation layer 110. Electrically conductive vias 114A and 114B may be formed in the thermally-insulative layer 112, aligned with the metallic contacts 106A, 106B, to enable electrical connections to be made with elements formed towards the upper surface of the platform 100.

The thermally-insulating layer may have a thickness of 10 μm to 50 μm. Using a thickness below 10 μm, in some applications, would not provide sufficient thermal resistance to be useful. There are processing difficulties in providing a thickness above 50 μm, and the vias are difficult to form. The thermally-insulating layer may have a range of thermal conductivities depending on the material used. In one example, the thermal conductivity is between 0.1 and 1 W/mK. In one example, the thermal conductivity is between 0.15 W/mK and 0.25 W/mK. These ranges of thermal conductivities may be achieved by organic polymers, which are particularly well suited to this application.

The objective, in terms of thermal design, is to achieve an appropriate thermal resistance. The thermal resistance of the thermally-insulative layer is dependent on thickness and thermal conductivity. Organic polymers of the thicknesses described above have the required thermal conductivities to achieve the desired thermal resistance. Another benefit or organic polymers is that that can be deposited lithographically. The thermal resistance may be determined by dividing the thermal conductivity by the thickness. For example, when using a polymer having a thermal conductivity of 0.2 W/mK, and a thickness of 25 μm, the thermal resistance may be 8000 W/m$^2$K. The polymer dominates the other materials in determining the thermal resistance. In once example, the thermal resistance of the thermal platform may be between 2000 W/m$^2$K and 15,000 W/m$^2$K. In another example, the thermal platform has a thermal resistance of between 5000 W/m$^2$K and 10,000 W/m$^2$K. In another example, the thermal resistance is between 7,000 W/m$^2$K and 9,000 W/m$^2$K.

As noted above, the thermally-insulative layer 112 may be formed from an organic polymer. This may be one or more layers of polyimide. In one example, an inter-Layer Dielectric (ILD) may be formed over the substrate 104. The layer of thermally-insulating material 112 is then formed over the ILD. In one example, a first layer of polyimide can form a passivation over the underlying substrate. A metal redistribution layer may then be provided above the passivation layer in order to provide the metallic contacts 106A, 106B. The redistribution layer can provide some of the required electrical paths for driving the heater and thermometer. A second layer of polyimide may then provide the bulk of the thermal isolation (for example having a thickness of 30 μm).

In another example, three layers of polyimide may be provided. The function of first layer remains the same as above. The second and third polyimide layers have a combined thickness of 30 μm, as above. For example, each of the second and third layers may be 15 μm. A further redistribution layer may be provided after the second layer of polyimide. A further example of a multilayer thermally-insulating layer is provided below.

The layer of polyimide may be less than 50 μm thick, and in one example is 20 μm to 30 μm thick. Polyimide has a thermal conductivity of around 0.14 W/mK. It should be noted that as an alternative to polyimide, the thermally-insulating material 112 may be SU8, in which case a thickness of less than 60 μm may be used. SU8 has a thermal conductivity of between 0.17 and 0.2 W/m-k may be used. An advantage of using SU8 Is that it has lower shrinkage than polyimide. The lower the thermal conductivity, the thinner the thermally-insulating layer can be.

The thermal platform 102 also has a metallic layer 116, which is formed over the top surface of the thermally-insulative layer 112. The metallic layer 116 is patterned to form a heating element 118 and a thermometer, or temperature sensor, 120. These parts of the metallic layer 116 are coupled to the vias 114A, 114B by other patterned parts of the metallic layer, as shown in FIG. 1. Current may be passed through the heating element 118 in order to perform a heating operation. The metallic layer 116, and hence heating element 118 and thermometer 120 may be made from gold. The heating element 118 and thermometer 120 may be formed using different metallic materials and processes. As will be described in more detail below, the thermometer and heater are isolated from each other during fabrication as part of the metallic patterning process.

The thermometer 120 may be a resistive element having a temperature coefficient of resistance which is known a priori or through calibration. The resistance may be measured by applying a test current through the element, and monitoring changes in voltage. Changes in voltage represent changes in resistance which may be mapped to temperature. The temperature sensor must have a convenient and stable temperature coefficient of resistance, and not exhibit degradation in resistive characteristics over time. The thermometer 120 provides an output which may be monitored on-chip or by an off-chip control module (not shown). In one embodiment, the thermometer 120 will be monitored by on-chip control circuitry which may provide a closed-loop feedback temperature control.

It will be appreciated that there are a number of ways in which the heater may be controlled, using electronic circuitry. The contents of this disclosure are concerned with the structure of the platform, rather than mechanisms for controlling it. It is expected that the skilled person would be able to adopt the required control circuitry using the knowledge available to the skilled person. The same is true for the temperature element. Techniques known to the person skilled in the art may be used to determine the temperature of the platform, using the temperature element provided as part of the structure.

The thermal platform 100 also includes a further passivation layer 122, formed over the top of the metallic layer 116 and the upper surface of the thermally-insulative layer 112. A thermal plate 124, which may be a reaction plate on which chemical processes may be carried out, is formed over the passivation layer 122. The passivation layer 122 may be made from Silicon Nitride or Aluminium Oxide and is intended to provide electrical and chemical isolation between the fluid above the platform 100 and the structure below. The passivation layer may have a thickness in the range of 0.5 μm to 1.5 μm, and optionally from 0.8 μm to 1.2 μm, for materials having a thermal conductivity of 10 W/mK (such as silicon nitride and aluminium oxide). In one example, the passivation layer may have a thickness of substantially 1 μm. The passivation layer may have a thickness of less than 1 μm for materials having a thermal conductivity of 1.3 W/mK (such as silicon dioxide). The thermal plate 124 may be made from gold or platinum, amongst other materials.

The size and shape of the thermal plate will depend on the application. The size and shape of the thermal plate, and the platform more generally, in the horizontal direction is not relevant to this disclosure. This disclosure is focused on the materials and processes used to manufacture the platform, and as such the dimensions in the vertical direction. In this disclosure, in order to facilitate clarity and an understanding of the overall structure, various shapes of the heaters, thermometers and thermal plate will be described. This shapes are purely illustrative, are in some cases taken from the prior art, and are not intended to contribute to the innovate aspects of this disclosure. They may however be used to assist in distinguishing the claims from any accidental anticipations. In most of the examples described herein, the thermal plate is described as circular, or substantially circular (manufacturing defects meaning the plate may not be exactly circular). This is the shape most commonly used in the prior art, and any number of other shapes may be used, as dictated by the application.

The thermal plate is typically less than 2 μm thick. A thicker plate is better able to equalize the temperature across its surface, which may be useful in some applications. However, a thicker plate is more difficult to manufacture, as processing defects are likely to arise. A thinner plate is easier to manufacture and uses less material, so may be cheaper. In one example, the plate is 1 μm thick, which provides a good balance of temperature equalisation and manufacturability. In one example, the plate may be between 100 nm and 3 μm thick. In another example, the plate may be between 500 nm and 1.5 μm thick. In examples where temperature control is less important, the plate may be thinner. For example, the plate may be less than 500 nm thick in such applications.

As noted above, the thermal plate may be made from gold or platinum. Noble metals, and in particular platinum group or precious metals, are particularly well suited for use in the thermal platform. They are inert, and have good characteristics in terms of their chemistry performance. For example, as described below, they are suitable for allowing molecules to bond to their surfaces.

In an alternative embodiment, the thermometer 120 and the heating element 118 may be formed from the same part of the metallic layer 116. When the heating element 118 doubles as a thermometer, switches may be provided within the substrate so that during heating, the heating element may be provided with a heating current, and during temperature measurement, the same element may be provided with an excitation current. Although this example shows a single thermal site 102, the thermal platform 100 will typically have several thermal sites arranged over its upper surface 104.

In use, and depending upon the application, a fluidic medium (which may be liquid or gas, not shown) may be placed over the upper surface of the thermal platform 100. The type of fluidic medium will depend upon the application, but for example, in the case of chemical reactions, the fluidic medium may be an aqueous solution, comprising reagents necessary for the reaction. A cover may be positioned over the fluidic medium to channel the fluidic medium over the thermal plate. The details of this arrangement are not necessary for an understanding of the structure of the platform, which this disclosure is directed to. The requirements for the fluid channel and the cap will be familiar to a person skilled in the art.

As will be appreciated by a person skilled in the art, and as described in more detail below, the thermal platform 100 may be manufactured using semiconductor-based microfabrication techniques. As such, the substrate would typically be provided first, with the thermally-insulating material 112 being formed on top of substrate 104.

FIG. 1 highlights the two main structural features of the thermal platform 100. That is, firstly, the thermal platform itself, comprising the thermal plate, the thermal site 102, and secondly, the substrate 104, which may be a CMOS-based application specific integrated circuit (ASIC). In practice, these two elements are formed monolithically as an integrated platform. However, they may also be formed separately, and coupled together by appropriate tracks for the purposes of passing power and data.

Figure 1B:
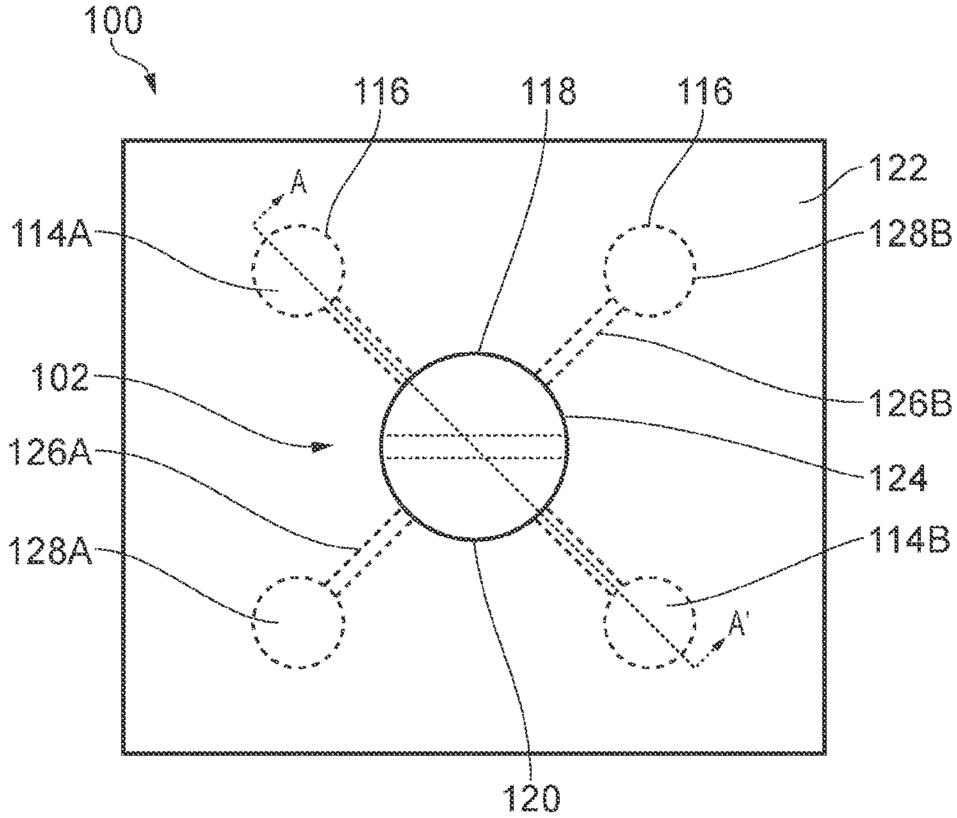
FIG. 1B is a plan view of the thermal platform of FIG. 1A.

FIG. 1B is a plan view of the thermal platform 100 of FIG. 1A. The cross-section of FIG. 1A is shown by dashed-line A-A'. From the top, the only components visible are the thermal plate 124 and the passivation layer 122. The other elements, including the heating element 118, thermometer 120 and other metallic layer 116 elements are shown using dashed lines, to indicate their position under the visible elements. As can be seen, in this example, the thermal plate 124 is circular, and the heating element 118 and thermometer 120 are semi-circular, sharing a common axis with the thermal plate 124. These shapes are illustrative, and are not intended to be limiting on the disclosure. The other metallic connections 126A, 126B and vias 128A, 128B for the heating element 118 and thermometer 120, which are not shown in FIG. 1A, are also shown. In this example, the thermal plate 124 is circular. The thermal plate 124 may also be square, hexagonal, or any other shape that may be appropriate for a particular application. Other shapes may be preferred, to effectively deliver heat and to measure the heating effect. Again, the specific shapes or dimensions, in the horizontal direction, are not intended to be limiting on the disclosure.

As noted above, the heating element 118 and the thermal plate 124 are formed from separate elements. This is particularly useful from a design perspective. It allows the heating element 118 to be designed for maximum heat generation while designing the thermal plate 124 for the purpose of whatever chemical or biological reaction is taking place at the surface.

As noted above, the thermal platform 100 may have a fluidic medium formed as a layer over the upper surface of the platform. The fluidic medium may be enclosed by a glass, silicon or an organic polymer cap, which may be bonded to the thermal platform using an o-ring seal. The cap may include openings for the fluidic medium to be introduced or removed from the thermal platform.

The heating element 118 and thermometer 120 are thin film structures. The thin-film structures are metallic conductors, with appropriate resistivity, and are characterised by stable properties when passing current. They may be formed using lithographic fabrication techniques.

The passivation layer 122 is a thermally-conductive passivation layer. For example this may be thin enough that it thermally conducts well. It should also be chemically inert to the reagents in flow cell. The thermal plate 124, which is fabricated from a metallic material, may be functionalised with a catalyst or selective film which contacts the reaction fluid in use, and which forms the centre of the thermal site.

When used in chemical reactions, the thermal plate may be referred to as a reaction plate.

Organic polymers, such as polyimide or SUB, provide good thermally-insulating properties, meaning that cooling of the top surface is not required. In some prior art examples, thermally conductive vias are provided to cool the top surface of the thermal platform, to control the heat and prevent heat reaching the underlying ASIC substrate. Some prior art examples also use cavities in the substrate to provide thermal insulation. These structures are not required when using a thin film layer of organic polymer. This simplifies manufacture, and reduces costs. There is no need to have silicon structures such as vlas and cavities.

The overall dimensions of the thermal platform will depend on the specific application. However, it will be noted that the thickness of the platform is dominated by the thickness of the thermally-insulating layer. For example, the thermally-insulating layer may have a thickness of 10 μm to 50 μm, and each of the passivation and metallic layers may have a thickness of 1 μm to 2 μm. As such, the overall thickness of platform may range from 10 μm to 55 μm. Preferably, the overall thickness is from 20 μm to 40 μm.

Method of Manufacture

The thermal platform 100 described above may be fabricated using semiconductor fabrication techniques. This may involve providing a silicon wafer layer, which may be provided with various electronic components, such as transistor components. As noted above, the details of these components are not necessary for an understanding of the structure and fabrication process of the thermal platform. The wafer may be supplied as a passivated wafer including pre-formed CMOS architecture. The passivation layer may then be planarised using a layer of polyimide, with openings formed in the polyimide and passivation layer to accommodate vias for connections to the cooling and heating plates. The vias may be formed using lithography and electroplating of thick metal. Alternatively, evaporation or sputtering techniques may be used. The thermally-insulating layer of polyimide may be formed using coating, exposing, developing and curing steps. The heating elements may be formed in a similar manner to the vias, using lithography and electroplating. The thermally-conductive layer of Silicon Nitride or Aluminium Oxide may be formed using deposition and patterning. The reaction plate may be formed by one of electroplating, evaporation or sputtering, with necessary patterning.

FIGS. 2A to 2L show a series of plan and cross-sectional views of the thermal platform 100 during the fabrication process. The fabrication process will now be described in connection with FIGS. 2A to 2L and also in connection with the flowchart shown in FIG. 3. The thermal platform will typically be monolithically integrated with the silicon ASIC substrate, however in the following process we will focus on the fabrication of the thermal platform itself.

Figure 2A:
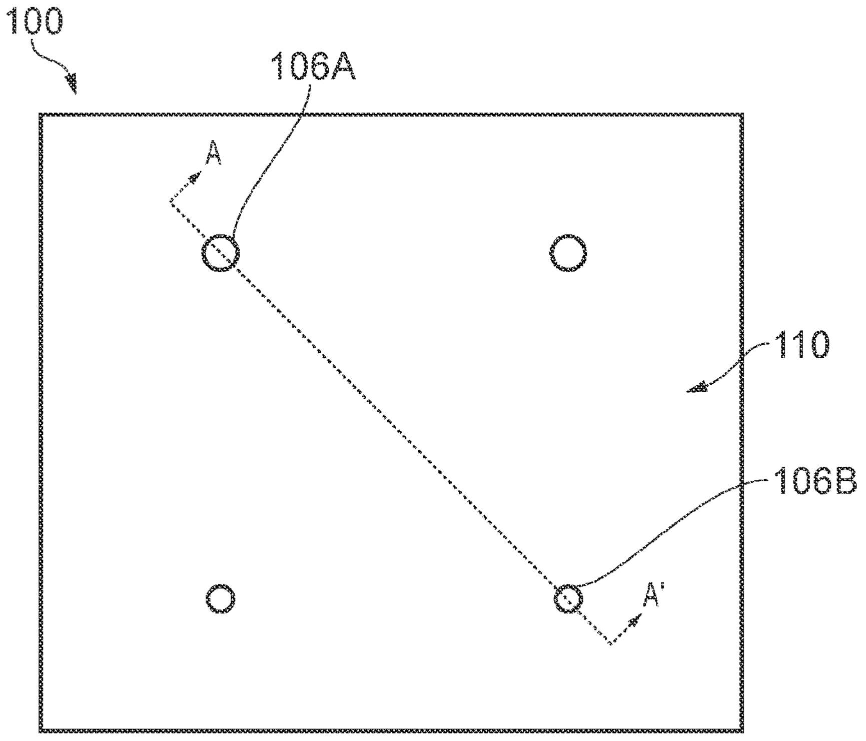
FIGS. 2A to 2L show a sequence of cross-sectional and plan views of the thermal platform of FIG. 1A during the fabrication process.
Figure 2B:
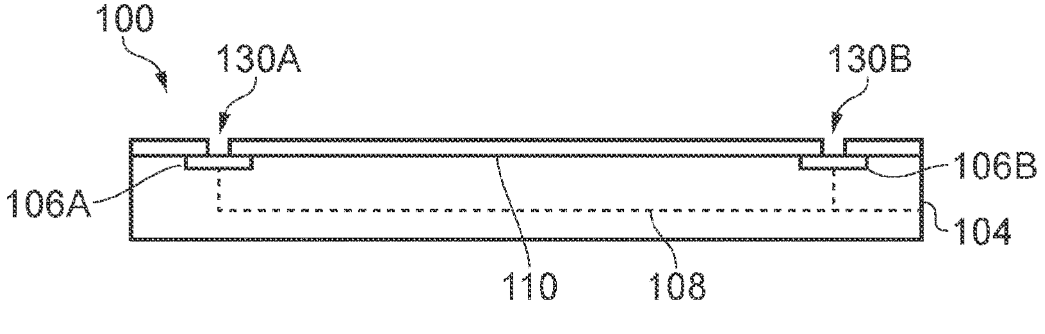
Figure 3:
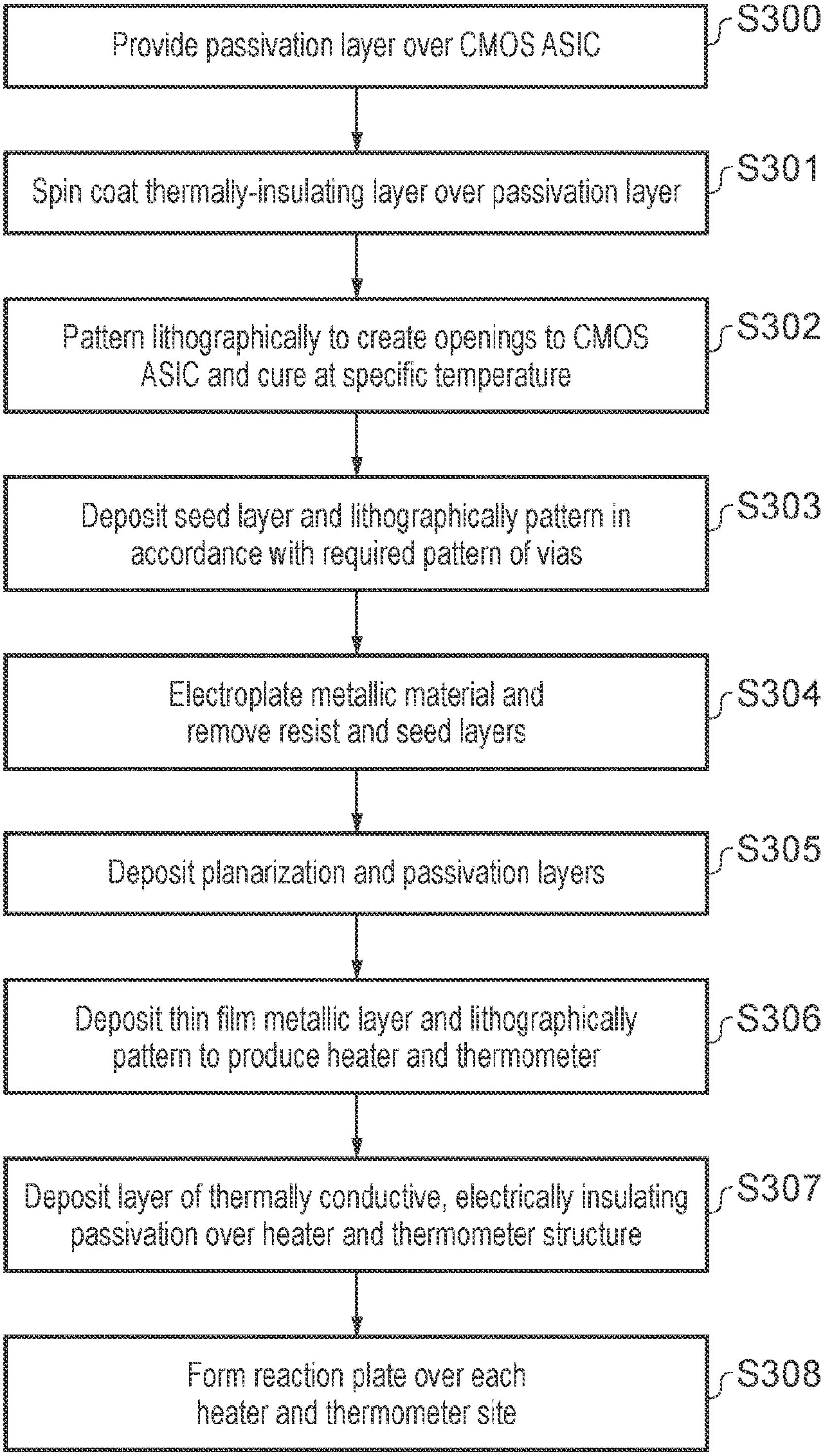
FIG. 3 is a flow chart showing the steps of the fabrication process of FIGS. 2A to 2L.

FIGS. 2A and 2B show the first step in the fabrication process. The first step in the fabrication process is the provision of the passivation layer 110 over the top of the CMOS ASIC substrate 104 (S300). FIGS. 2A and 2B also show various openings in the passivation layer which show underlying metallic contacts 106A, 106B. The metallic contacts may be formed as part of the upper surface of the underlying CMOS ASIC 104. Alternatively, the metallic contacts 106A, 106B may be formed as an initial step prior to step S300. As shown more clearly in the cross-section of FIG. 2B, the passivation layer 110 includes openings 130A and 130B which are aligned with metallic contacts 106A and 106B which are contacts for the heating element 118 and thermometer 120, as will be explained in more detail below.

In an alternative to the step described in connection with FIGS. 2A and 2B, the passivation layer 110 may be formed as part of the fabrication process of the CMOS ASIC 104, and therefore represent an upper layer of the CMOS ASIC substrate.

Figure 2C:
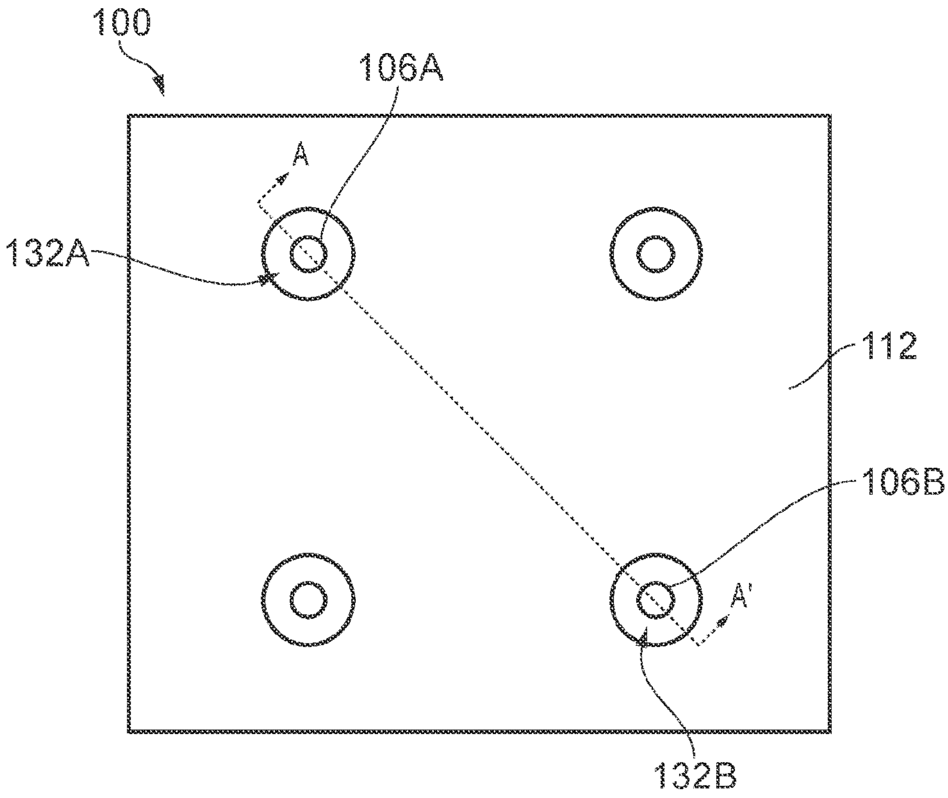
Figure 2D:
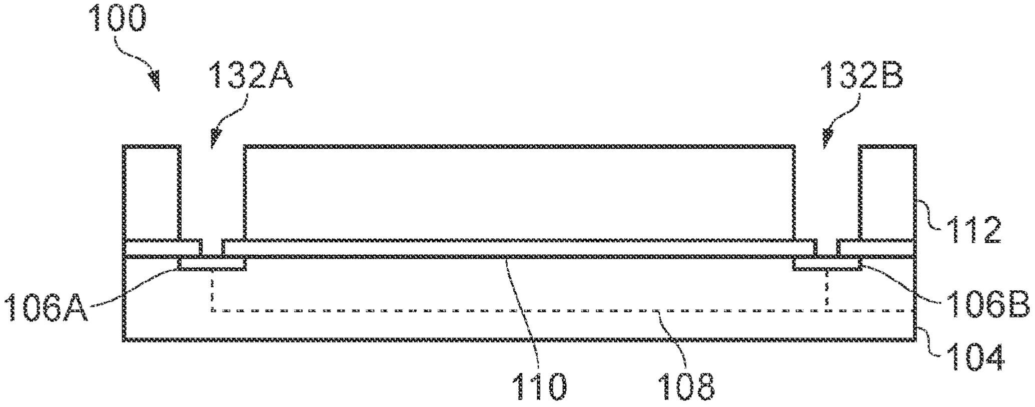

FIGS. 2C and 2D show the next step in the fabrication process. Here, a thermally-insulating layer 112 is deposited on the passivation layer 110 by spin coating (S301). The thermally-insulating layer 112 is an organic polymer material of specific thermal conductivity, which is configured to prevent the heat generated in the heater from dissipating directly into the underlying silicon substrate. The thermally-insulating layer 112 is then patterned lithographically to create openings down to the metallic contacts 106A, 106B, for example, creating openings 132A and 132B as shown in FIG. 2D. The thermally-insulating layer 112 is cured at a specific temperature to provide physical robustness and the required specific thermal conductivity parameters (S302). The thermally-insulating layer 112 may be deposited as a single layer or in multiple steps, as described above.

Figure 2E:
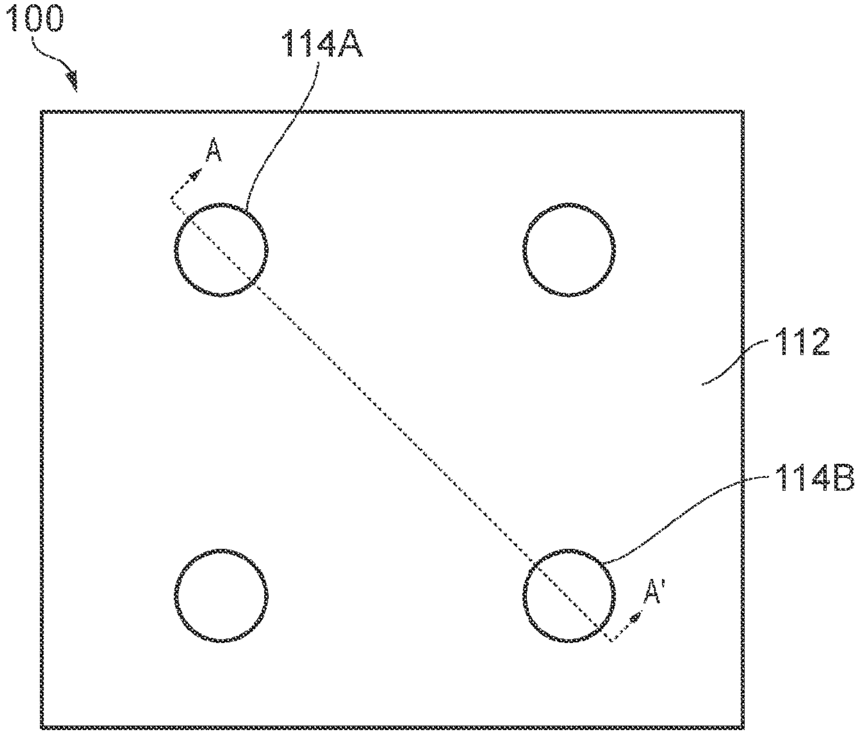
Figure 2F:
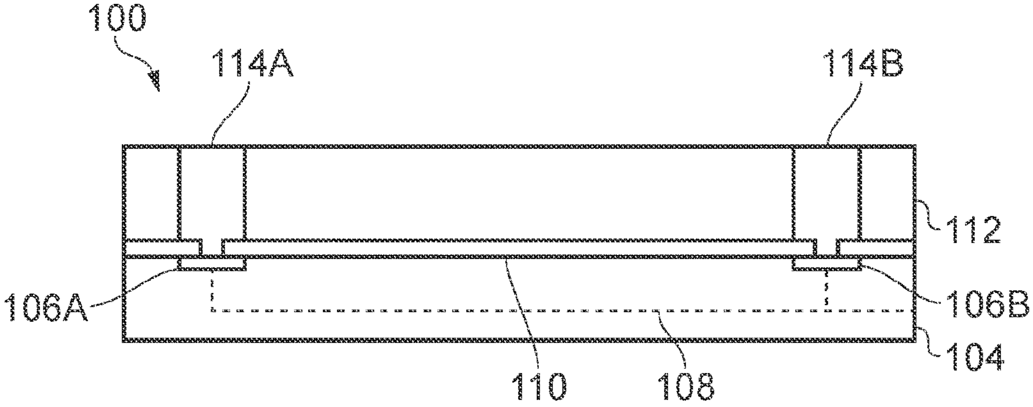
Figure 2G:
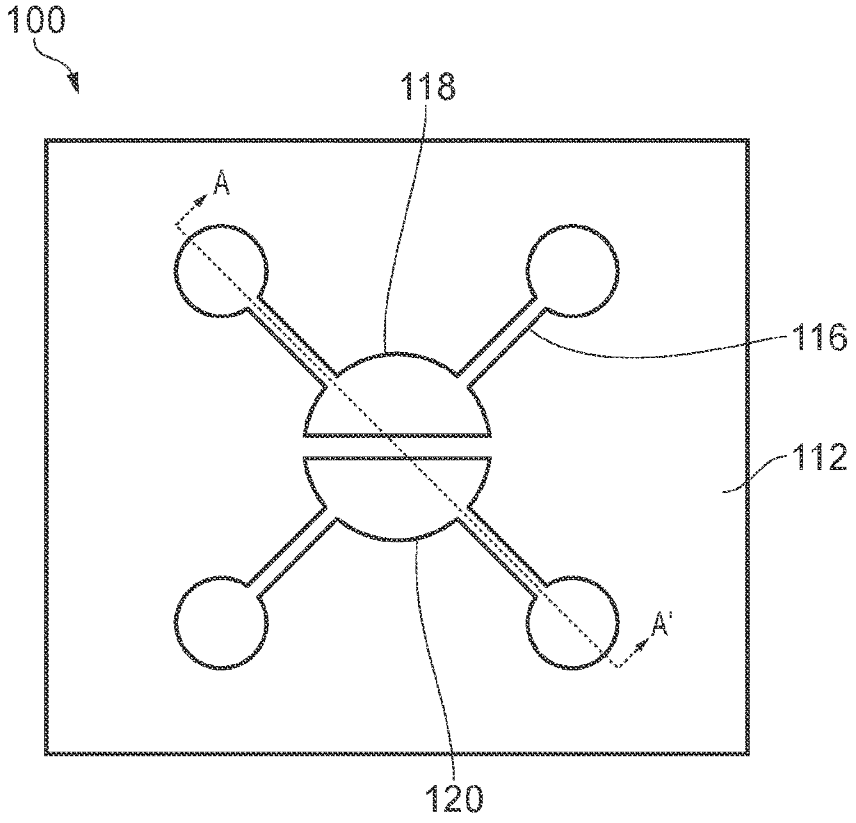
Figure 2H:
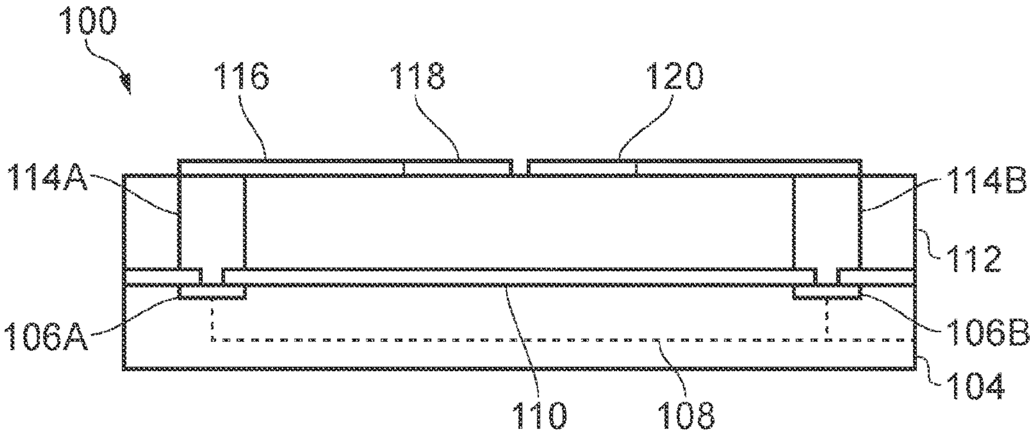

In the next stage of the fabrication process, shown in FIGS. 2E and 2F, the metallic vias 114A, 114B are provided to fill the openings 132A, 132B. The first step in this part of the fabrication process is to deposit a thin-film seed layer, which may for example be titanium tungsten (TiW) or gold (Au). This layer may then be covered in a resist layer in the required pattern, after which the seed layer is lithographically patterned in accordance with the resist layer to create the pattern shown in FIGS. 2E and 2F. This is shown as step S303 in FIG. 3. The metallic material is then electroplated into the vias, and the resist and seed layers are removed leaving the via openings 132A, 132B in the thermally-insulating layer 112, filled, or partially filled with metallic material (S304). As show in FIG. 2F, metallic vias 114A and 114B are formed in the openings in the thermally-insulating layer.

The next stage in the fabrication process may optionally include the provision of planarization and passivation layers. Although not shown in the Figures, a planarization layer of suitable material (polymer or other suitable material) may be provided over the thermally-insulating layer 112. The planarization layer may be used to create a uniform layer onto which the thin-film heater and thermometer are patterned. If provided, the planarization layer can be patterned to create openings to the metallic vias 114A and 114B. A passivation layer may be deposited on top of the planarization layer (S305).

The next stage in the fabrication process is to deposit the metallic layer 116 over the thermally-insulating layer 112 (or passivation layer if in place) to form the thin-film heater and thermometers. This may be done by forming a stack of metals rather than a single layer of material. For example, this may involve the deposition of a first layer of titanium tungsten (TiW) or ruthenium (Ru). This may be followed by one of gold (Au) or platinum (Pt). The choice of metals for the heater and thermometer will be based on the required thermal coefficient of resistance of the materials to provide a measurable change in resistance for temperature and a change in temperature for applied current. The heater material must be selected to be robust against electro-migration under large currents used for heating. The thermometer material is exposed to lower excitation currents, but must have parametrically stable resistivity during the operation of the device, so that calibration of the thermometer is maintained. If a single material fulfils both requirements, it may be used. Otherwise, different materials may be used for the heater and the thermometer. One example of which may be a sandwich of materials.

One of the parameters used to select appropriate materials for the heater and thermometer is the temperature coefficient of resistance (TCR). This is a measure of the fractional change in resistance per degree Celsius of temperature change. Table 1 provides a list of some of the materials which may be used, together with their TCR values.

TABLE 1

| Material | TCR (fractional change in resistance per degree) |
|---|---|
| TiW | 0.0003 |
| TiN | 0.0004 |
| Au | 0.0037 |
| Ti | 0.0038 |
| Pt | 0.0039 |
| Ru | 0.0041 |
| Mo | 0.00435 |
| W | 0.0045 |
| Ni | 0.0064 |

The thin-film metal deposits may be lithographically patterned to create the heater and thermometer structures. For example, in FIGS. 2G and 2H the heater 118 and the thermometer 120 are shown. As can be seen, the heater 118 and thermometer 120 are semi-circular in shape and are coupled by tracks at either end to the vias 114A, 114B, 114C and 114D. The semi-circular active areas of the thermometer 120 and heater 118 together form a circular shape which will be situated under the thermal plate 124. This process is shown in step 306 of FIG. 3. These shapes are shown as non-limiting examples, purely to enable the skilled person to understand the overall thermal platform design.

In this embodiment the heater 118 and thermometer 120 are shown as separate elements. Alternatively, they may be formed as part of the same structure. If formed as part of the same structure, the same materials are used for the heater and thermometer. If formed of separate elements, the heater and thermometer may be formed from the same materials, or alternative materials may be used.

Figure 2I:
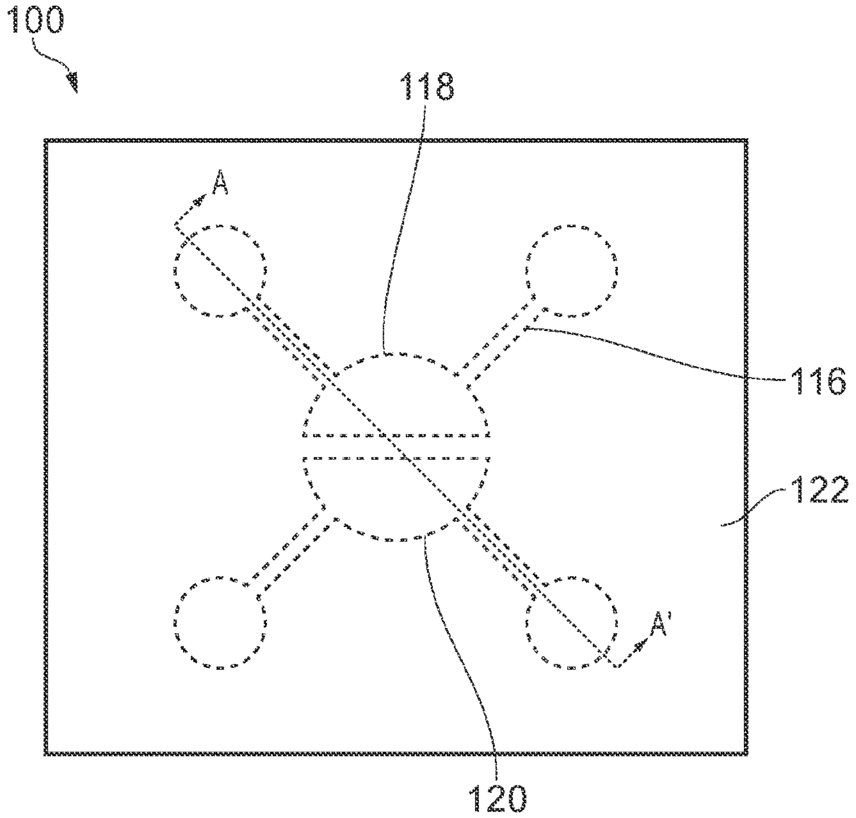
Figure 2J:
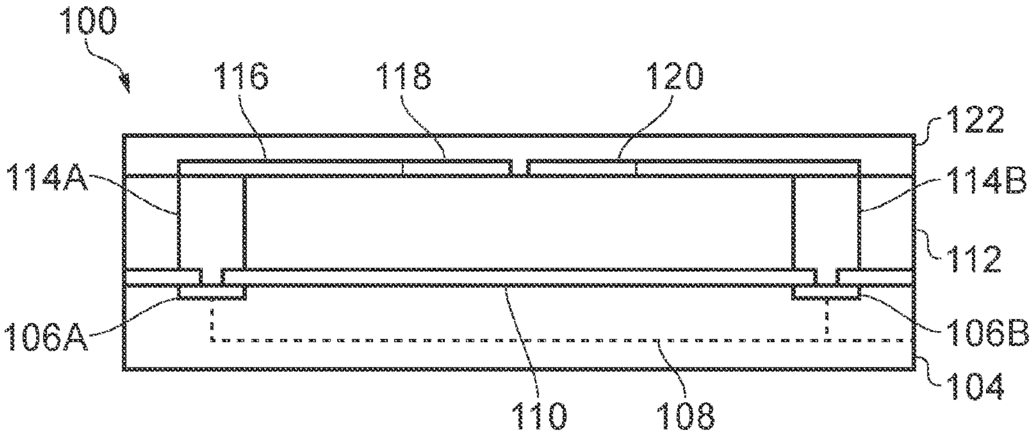

FIGS. 2I and 2J show the next step in the fabrication process. The thermally conductive passivation layer 122 is deposited over the heater 118 and thermometer 120. In FIG. 2I, the heater 118 and thermometer 120 structures will not be visible, however are shown in outline to assist the reader. The upper passivation layer 122 is shown in FIGS. 2I and 2J. This step of the process is shown in step S307 of FIG. 3.

Figure 2K:
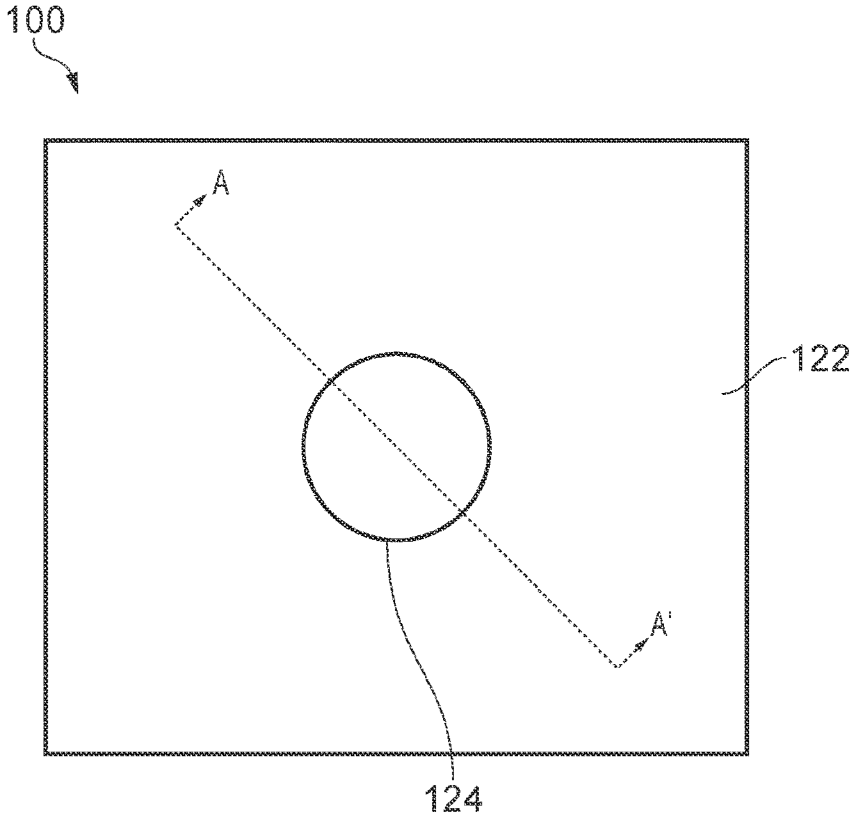
Figure 2L:
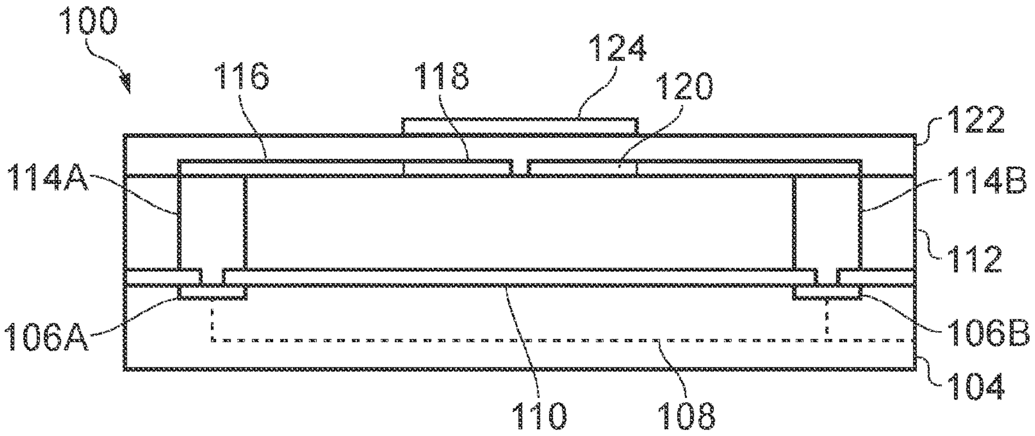

The final step of the process is shown in FIGS. 2K and 2L where the thermal plate 124 is formed on top of the passivation layer 122. The thermal plate 124 may be formed by deposition, evaporation or electroplating. In this example, the thermal plate 124 is circular and is aligned with the semi-circular heater 118 and thermometer 120 structures. It will be appreciated that other shapes may be used, and the design of the reaction plate may in part be dependent on the shape of the heater and thermometer. This is shown in step S308 of FIG. 3.

Figure 4:
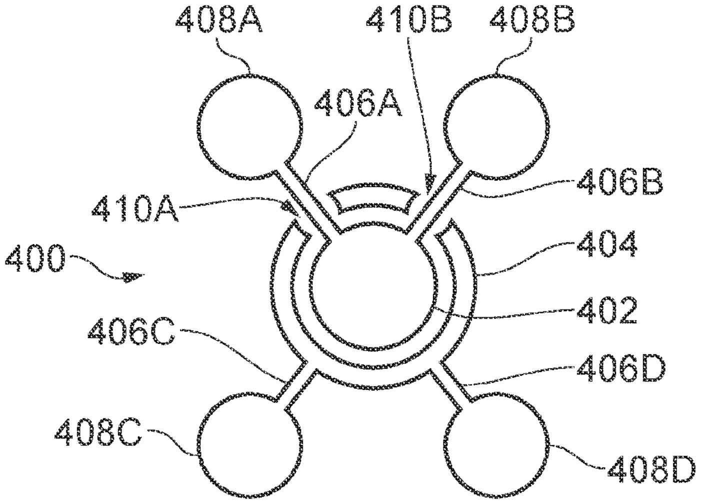
FIG. 4 is a schematic diagram showing alternative arrangements for the heater and thermometer of the thermal platform of FIG. 1B.

FIG. 4 shows an alternative design for the heater and thermometer structure. FIG. 4 shows a heater and thermometer structure 400. The structure includes a circular central heater 402 surrounded by a co-axial circular thermometer 404. Again, this shape is provided purely as an illustrative example. The heater and thermometer are both connected by a pair of tracks 406A to 406D to a pair of conducted pads 408A to 408D. In this example, to facilitate connection of the heater to the pads which are outside of the periphery of the thermometer, gaps 410A and 410B are formed in the thermometer.

It will be appreciated that a variety of other shapes may be used for the heater and thermometer arrangement. For example, each of the heater and thermometer may follow a meandering arrangement to enable the length of the structures to be increased or decreased (depending on the degree of meandering) in order to vary their resistances. For example, the heater and thermometer could follow meandering serpentine-like shapes. However, the shapes described and shown herein are provided purely as illustrative examples, and are not relevant to the innovative aspects of the materials or processes which form part of the stack shown and described herein.

In one embodiment of the disclosure, the thermal platform and the ASIC substrate are monolithically integrated. In prior art examples, generally the thermal platform is produced as a separate piece to the processing circuitry. By producing the thermal platform and ASIC as a monolithic circuit, a single package may be produced that provides the thermal platform and integrated processing capability.

Applications

The above described thermal platform may be utilised in a number of applications, as is known in the art. Some chemical reaction-based applications are provided below, merely as examples of the application of this technology.

Figure 5:
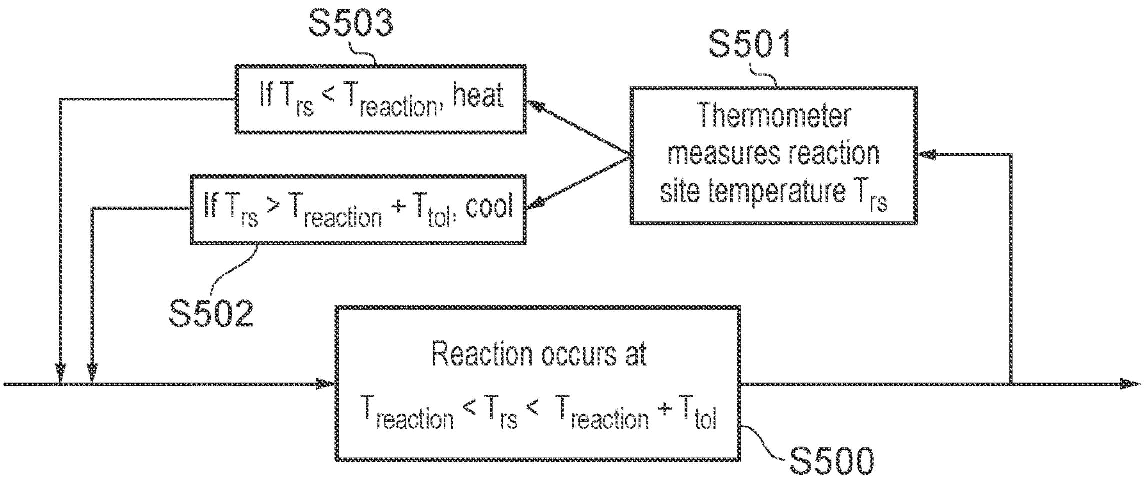
FIG. 5 is a flow chart showing a generic temperature control methodology.

FIG. 5 shows a flow diagram for a temperature control process for a generic chemical reaction. A chemical reaction occurs when the temperature at the reaction site (Trs) is between the reaction temperature and a controlled tolerance temperature range (S500). The thermometer measures the reaction site temperature (Trs), as described above in connection with the thermal platform and ASIC substrate (S501). If Trs is too high, the heater is not turned on, and the reaction site cools (S502). This may be achieved by natural cooling, as per some embodiments, or an active cooler is used to reduce Trs towards Tlow. If Trs is too low, the heater is turned on, and the reaction site heated (S503). The reaction site Trs should be controlled within the tolerance temperature range (Ttol).

Figure 6:
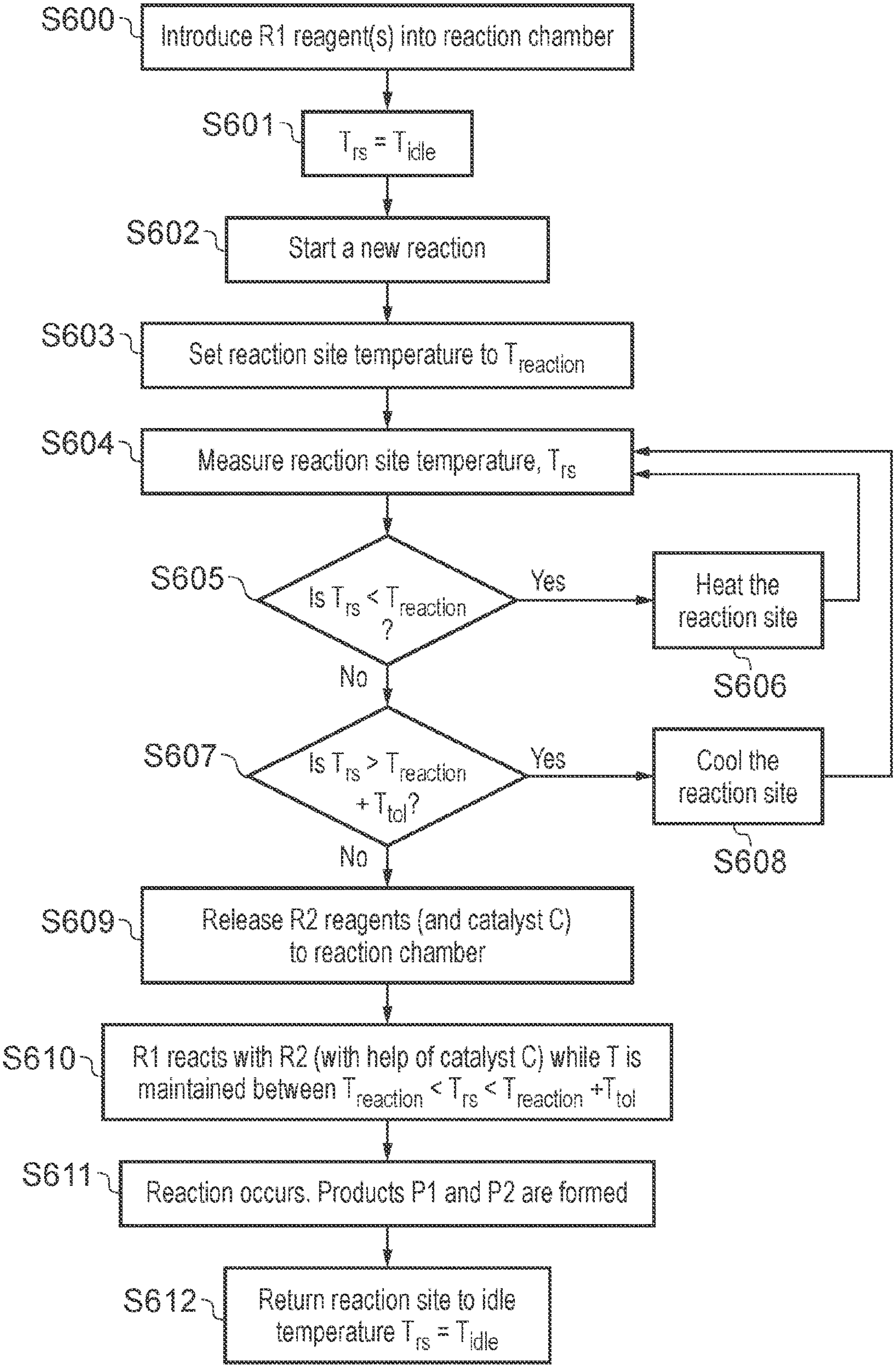
FIG. 6 is a flow chart showing a method of operation for an example chemical reaction using the thermal platform of an embodiment of the disclosure.

FIG. 6 is a more detailed flow chart showing the steps taken during a specific chemical process, in which a molecule R1 adheres to the surface of the reaction plate, and reactions occur near the surface of the reaction plate. As a first step, R1 is introduced into the fluid reaction chamber (S600). The surface of the reaction plate is covered with a coating that allows selective attachment of molecule R1. Examples of such coatings includes self-assembled monolayers (SAMs) such as thiols on metals, silanes on silicon-based dielectrics. Examples of thiols (R—S—H) include alkanethiols, PEG-thiol. Example of silanes include APTMS (3-Aminopropyltrimethoxysilane), APTES ((3-Aminopropyl)triethoxysilane). Examples of linkers used in the SAM design include alkanes, PEG, p-Phenylene diisothiocyanate (PDTIC).

The R1 molecules diffuse to the reaction plate (electrode) surface where they adhere to the reaction plate surface. Optionally, unbound R1 molecules can be removed using a wash step. Initially, Trs is equal to the ambient idle temperature (S601). The user (or automated process) indicates that a new reaction is to take place (S602) and the reaction site temperature ($T_{reaction}$) is set (S603). The thermometer measures Trs (S604). If Trs is too low (S605), the heater is turned on (S606). If Trs is too high (S607), the heater is turned off (S608). The thermal site is cooled naturally, or using active cooling. This process continues to keep the thermal site at the reaction temperature.

One the reaction temperature is established, a second molecule, R2, is introduced to the chamber (S609), optionally with a catalyst, C. R1 reacts with R2, with the help of the catalyst (if present) while the temperature is maintained at the reaction temperature (S610). A product including P1 and P2 is formed as the reaction occurs (S611):

$$\mathrm{R1} + \mathrm{R2} \xrightarrow{\mathrm{C}} \mathrm{P1} + \mathrm{P2}$$

This occurs quicker in the present of a catalyst. P1 and P2 are formed and are attached to the surface of the reaction plate. The process can be iterative, and further molecules may be introduced as required. Once the reaction is complete, the thermal site is returned to the idle temperature, $T_{idle}$ (S612).

In one embodiment, the reaction could be polymeric; i.e. the addition step is repeated multiple times to constitute a polymer. Examples of polymers include organic polymers and protein assembly (polymers of amino adds).

In an alternative to the above described chemical process, R1 may stay suspended above the reaction site, and the reaction may occur in the volume above the thermal plate. In this case, R1 equilibrates at a certain concentration in the reaction chamber. The reaction with R2, for example, only occurs above the reaction site. Outside of this region, R1 and R2 mix without reacting.

Examples of liquid-phase chemical reactions include:

Polymerase Chain Reaction (PCR);

Thermally-assisted hydrolysis and methylation; and

Other thermally-enabled reactions.

Examples of gas-phase chemical reactions include:

Vapour-phase reaction.

Further Examples

Figure 7A:
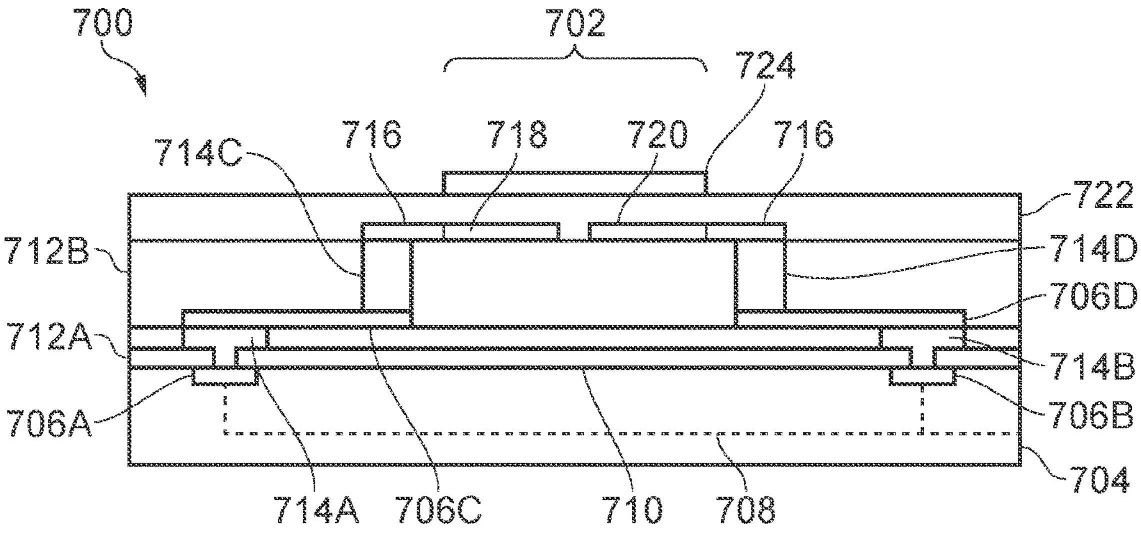
FIG. 7A shows a cross-section of a thermal platform in accordance with a further example of the disclosure.
Figure 7B:
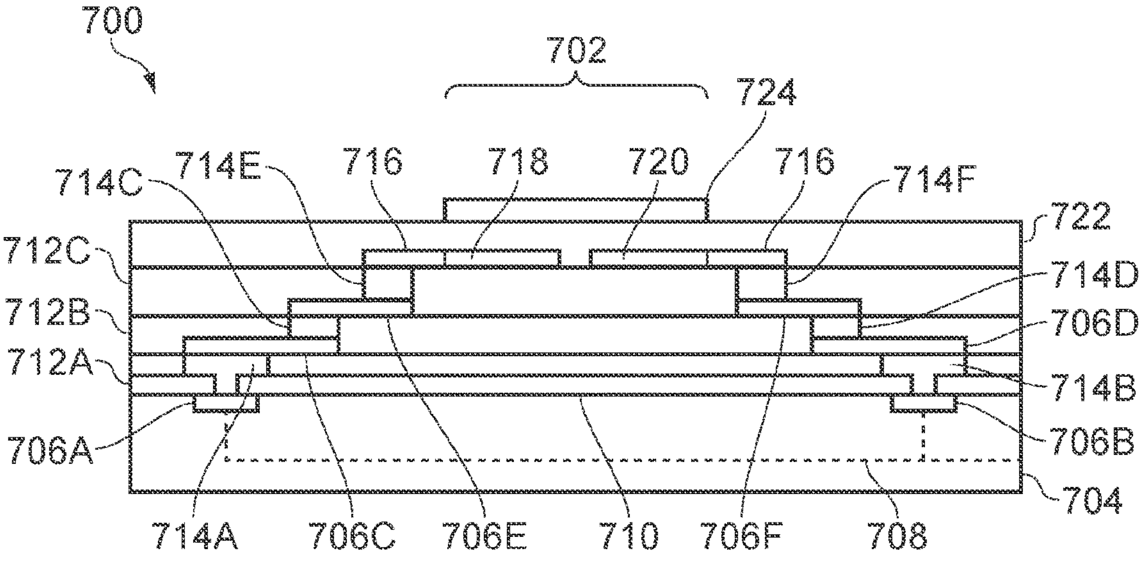
FIG. 7B shows a cross-section of a thermal platform in accordance with a further example of the disclosure.

FIGS. 7A and 7B show a further example of a thermal platform 700 in accordance with an example of the disclosure. These examples show a multilayer thermally-insulating layer. As will be noted, many of the features of these examples are the same as those in FIG. 1A. FIGS. 7A and 7B show a cross-section of a microfabricated thermal platform 700. In this example, the thermal platform 700 includes a single unit cell, or thermal site, as denoted generally by reference 702. The thermal platform includes a substrate 704, which may for example be a silicon wafer. The substrate 704 may include metallic contacts 706A, 706B, formed in the upper surface of the substrate. These contacts are for making electrical connections between the components of the thermal platform, and to any traces or circuitry in the substrate. In the example of FIG. 1, a trace 708 is shown.

A layer of passivation 710 is formed over the substrate 704. The passivation layer 710 has openings aligned with the metallic contacts 706A, 706B.

In FIG. 7A, the layer of thermally-insulating material comprises two sub-layers 712A and 712B which may be formed from an organic polymer. Electrically conductive vias 714A and 714B may be formed in the thermally-insulative layer sub-layer 712A, aligned with the metallic contacts 706A, 706B. A redistribution layer is then formed using metallic tracks 706C and 706D. Sub-layer 712B is then formed over these tracks. Further vias 714C and 714D are then formed in the sub-layer 712B, to enable electrical connections to be made with elements formed towards the upper surface of the platform 700.

FIG. 7B shows a three-layer alternative. Here, additional sub-layer 712C, tracks 706E, 706F and vias 714E and 714F are shown. The thermal platform 700 also has a metallic layer 716, which is formed over the top surface of the thermally-insulative sub-layers 712A to 712C. The metallic layer 716 is patterned to form a heating element 718 and a thermometer, or temperature sensor, 720.

The thermal platform 700 also includes a further passivation layer 722, formed over the top of the metallic layer 716 and the upper surface of the thermally-insulative layer 712. A thermal plate 724, which may be a reaction plate on which chemical processes may be carried out, is formed over the passivation layer 722.

There are various benefits to using multiple sub-layers. For example, processing may be easier, as the individual layers are thinner and easier to deposit. Furthermore, using multiple sub-layers enables redistribution of the metallic tracks, as shown. This means that the location and design of the heaters and metallic layer 716 can be decoupled from the location and design of the metallic contacts 706A, 706B. As can be seen in FIGS. 7A and 7B, the metallic contacts 706A, 706B do not have to align with the metallic layer 716. This allows greater design freedom. In addition, the first sub-layer functions as a planarization layer (in addition or in place of the passivation layer 710). As further sub-layers are added, this can provide additional planarization, improving the overall integrity of the device. Thinner sub-layers have less variation in thickness than thicker layers (i.e. the thickness of a thinner layer is easier to control), so using multiple thinner layers results in a more planar design.

Each sub-layer may have a thickness of between 5 μm and 50 μm. In FIG. 7A, the layer 712A is around 5 μm and the layer 712B is around 20 μm. The ratio of the thicknesses may be 1:1, or may be in the range of 1:5 to 1:1 (either layer 712A:712B or 712B:712A). In FIG. 7B, the layer 712A is around 5 μm, the layer 712B is around 10 μm, and the layer 712C is around 10 μm. The ratio of the thicknesses of the layers may be 1:1:1 (712A:712B:712C), or in the range 1:5:5 to 1:1:1.

The invention claimed is:

1. A microfabricated thermal platform for controlling a temperature of a fluid or other material positioned over the thermal platform, the platform comprising a plurality of microfabricated layers, the platform further comprising:

a thermally-insulating layer, formed from an organic polymer, having a predefined thermal conductivity, the thermally-insulating layer configured to provide thermal insulation between the fluid or other material positioned over the thermal platform, and a substrate positioned beneath the thermal platform;

an electrically-conductive layer, formed on or adjacent an upper surface of the thermally-insulative layer, the electrically-conductive layer patterned to define at least one heating element and at least one track;

one or more electrically conductive vias, formed in the thermally-insulating layer, the vias electrically coupled to the electrically-conductive layer, and wherein the at least one track respectively extends from a corresponding individual one of the at least one heating element to a corresponding position that is respectively aligned with a corresponding individual one of the one or more electrically conductive vias;

an electrically-insulative layer, formed over the electrically-conductive layer; and at least one thermal plate, formed over the electrically-insulative layer;

wherein the at least one heating element and the at least one thermal plate define a thermal site in which the temperature of a fluid or other material positioned over the thermal platform is controllable.

2. The platform of claim 1, wherein the thermally-insulating layer has a thermal conductivity from 0.1 W/mK to 1 W/mK.

3. The platform of claim 1, wherein the thermally-insulating material has a thickness of between 10 μm and 50 μm.

4. The platform of claim 3, wherein the thermally-insulating material has a thickness of between 20 μm and 30 μm.

5. The platform of claim 1, wherein the thermally-insulating layer is polyimide or SU8.

6. The platform of claim 1, wherein the one or more electrically conductive vias extend from an upper surface to a lower surface of the thermally-insulating layer.

7. The platform of claim 1, wherein the thermally-insulating layer comprises two or more sub-layers.

8. The platform of claim 7, further comprising at least one metallic redistribution layer, formed between the two or more sub-layers.

9. The platform of claim 8, wherein each sub-layer comprises one or more electrically-conductive vias, the vias of two adjoining sub-layers being offset and coupled to each other using the at least one metallic redistribution layer.

10. The platform of claim 9, wherein the one or more vias in a lower sub-layer of the two or more sub-layers are offset with connections between the one or more vias of an upper sub-layer and the electrically-conductive layer.

11. The platform of claim 1, wherein the electrically-conductive layer is patterned to further define at least one track, each extending from the heating element to respective positions aligned with the one or more vias.

12. The platform of claim 1, wherein the electrically-conductive layer is patterned to further define one or more thermometers.

13. The platform of claim 12, wherein the electrically-conductive layer is patterned to further define at least one track, respectively extending from an individual one of the one or more thermometers to corresponding positions aligned with the one or more vias.

14. The platform of claim 1, wherein the electrically-conductive layer, is a metallic layer.

15. The platform of claim 1, wherein the electrically-insulative layer is a passivation layer having a thickness of less than or equal to 2 μm.

16. The platform of claim 15, wherein the electrically-insulative layer is one of Silicon Nitride, Silicon Dioxide and Aluminum Oxide.

17. The platform of claim 1, wherein the thermal plate is less than 2 μm thick.

18. The platform of claim 1, wherein the thermal plate substantially overlaps the heating element.

19. The platform of claim 1, wherein the thermal plate is a metallic plate.

20. The platform of claim 1, further comprising: a substrate, positioned below and monolithically integrated with the thermally-insulating layer.

21. The platform of claim 1, wherein overall thickness of the platform is from 10 μm to 55 μm.

22. A method of microfabricating a thermal platform, comprising:

depositing an organic polymer to form a thermally-insulating layer having a predefined thermal conductivity;

forming one or more electrically conductive vias in the thermally-insulating layer;

depositing an electrically-conductive layer, on or adjacent an upper surface of the thermally-insulating layer, such that the electrically-conductive layer is electrically coupled to the one or more vias, wherein the depositing the electrically-conductive layer includes electroplating a thin-film metallic layer;

lithographically patterning the electrically-conductive layer to define at least one heating element and at least one track, wherein the at least one track respectively extends from a corresponding individual one of the at least one heating element to a corresponding position that is respectively aligned with a corresponding individual one of the one or more electrically conductive vias;

forming an electrically-insulative layer over the electrically-conductive layer; and depositing at least one thermal plate over the electrically-insulative layer.

23. A method according to claim 22, wherein the step of depositing the electrically-conductive layer is a step of electroplating a thin-film metallic layer, and the step of patterning the electrically-conductive layer is a step of lithographically patterning the layer to define the heating element.

24. A method according to claim 23, wherein the step of lithographically patterning the electrically-conductive layer also includes defining at least one thermometer.

25. A method according to claim 22, wherein the step of depositing the organic polymer is a step of spin coating.

26. A method according to claim 22, wherein the organic polymer is deposited as multiple sub-layers.

27. A microfabricated thermal platform, comprising one or more thermal sites configured to control a temperature of a fluid or other material at the one or more thermal site, the thermal platform including a plurality of layers, formed using microfabrication, and including a layer of organic polymer having a predetermined thermal conductivity and forming a thermally-insulated layer that includes one or more electrically conductive vias, each of the one or more thermal sites including at least one heating element, to heat the fluid or other material, and a thermal plate and at least one track that respectively extends from a corresponding individual one of the at least one heating element to a corresponding position that is respectively aligned with a corresponding individual one of the one or more electrically conductive vias.

28. A microfabricated thermal platform, comprising one or more thermal sites configured to control a temperature of a fluid or other material at the one or more thermal site, the thermal platform including a plurality of layers, formed using microfabrication, and including a layer of organic polymer having a predetermined thermal conductivity, each of the one or more thermal sites including a heating element, to heat the fluid or other material, and a thermal plate, wherein the thermal plate is functionalized with at least one of a catalyst or selective film that contacts a reaction fluid in use to serve as a reaction plate for a specified chemical reaction.

29. A method of microfabricating a thermal platform, comprising:

depositing an organic polymer to form a thermally-insulating layer having a predefined thermal conductivity;

forming one or more electrically conductive vias in the thermally-insulating layer;

depositing an electrically-conductive layer, on or adjacent an upper surface of the thermally-insulating layer, such that the electrically-conductive layer is electrically coupled to the one or more vias, wherein the depositing the electrically-conductive layer includes electroplating a thin-film metallic layer;

lithographically patterning the electrically-conductive layer to define at least one heating element;

forming an electrically-insulative layer over the electrically-conductive layer; and depositing at least one thermal plate over the electrically-insulative layer.

30. A method according to claim 29, wherein the step of lithographically patterning the electrically-conductive layer also includes defining at least one thermometer.

* * * * *